United States Patent

Dehmelt

[11] 3,895,959
[45] July 22, 1975

[54] SEALED, GAS-TIGHT ELECTRIC STORAGE BATTERY

[76] Inventor: Klaus H. Dehmelt, Oberjasse 28, 6374 Steinbach, Tannus, Germany

[22] Filed: Oct. 18, 1974

[21] Appl. No.: 516,096

[30] Foreign Application Priority Data
Oct. 27, 1973 Germany.................... 2353958

[52] U.S. Cl............................... 136/6 R; 136/111
[51] Int. Cl. ........................................ H01m 35/00
[58] Field of Search .................... 136/6 R, 108–111

[56] References Cited
UNITED STATES PATENTS

| | | | |
|---|---|---|---|
| 2,307,768 | 1/1943 | Deibel.............................. | 136/108 |
| 2,418,442 | 4/1947 | Wiencke............................ | 136/111 |
| 2,920,127 | 1/1960 | Vogt................................. | 136/6 R |
| 2,928,890 | 3/1960 | Van Der Grinten et al.... | 136/111 X |
| 3,003,013 | 10/1961 | Dreddy............................ | 136/111 X |
| 3,440,105 | 4/1969 | Yamamoto et al. .............. | 136/108 |
| 3,597,276 | 8/1971 | Jammet............................ | 136/111 |
| 3,770,505 | 11/1973 | Bergum et al. ................. | 136/111 X |
| 3,784,410 | 1/1974 | Bergum et al. ................. | 136/111 X |

Primary Examiner—John H. Mack
Assistant Examiner—C. F. Lefevour
Attorney, Agent, or Firm—H. Gibner Lehmann; K. Gibner Lehmann

[57] ABSTRACT

A sealed gas-tight electric storage battery constituted of multiple cells, comprising a circular metal container having a gasketed and insulated metal cover, these parts preferably constituting the battery terminals. Within the container there are formed gas-tight and liquid-tight compartments, by means of stacked circular spacers which line the insides of the circular container walls, and by isolating circular plates interposed between the spaces. Each compartment contains elements which form at least one battery cell. Connections can be established between cells, or groups of cells, by the circular isolating plates which can be of metal, or of insulation carrying metal contacts. The isolating plates seal tightly with the circular spacers, which latter can seal against the container walls as well. With the arrangement provided, the single metal container and its sealed cover are common to all the cells, effecting optimum space and weight utilization, with a substantial reduction of parts and assembly coats.

14 Claims, 6 Drawing Figures

SEALED, GAS-TIGHT ELECTRIC STORAGE BATTERY

BACKGROUND

The invention relates to gas-tight electric batteries, and more particularly to storage batteries of the alkaline, nickel-cadmium type, constituted preferably of from two to ten cells.

The voltage of a single storage battery cell is, in nickel-cadmium systems, about 1.2. This voltage suffices only in rare cases to operate usual electronic circuits, small motors or lamps. These storage battery cells are therefore mostly connected in series, depending on the intended use. Since appliance manufacturers demand primarily voltages of from 2.4 to about 12.0, two to ten storage cells must be combined.

So-called "button" cells have been put on the market and have found wide-spread use. The individual cells are encased separately in boxes or containers, and have a voltage of about 1.2. Multiple units or batteries made up of such button cells are also on the market, wherein the casings of the individual cells are rigidly connected with each other by various spot welding methods requiring connecting parts which are in addition to the individual casings. The construction of these multi-cell batteries is not especially simple, particularly since insulation is required in order to avoid short circuiting of the series-connected units. In the manner of built-up columns of button cells, for example, a shrinkable sleeve which is pulled over the assembled battery, must be shrunk. Due to the fact that each individual cell must have a metal container or box and a sealing cover suitable for gas-tight operation, the volume and weight of these prior batteries are unnecessarily increased.

It is also known to form dry cell batteries by arranging each cell in a trough-shaped plastic box or case which is open at both the bottom and the top, and to stack the cells and their plastic cases, holding them together by a retaining band as illustrated in U.S. Pat. No. 2,416,576. These prior dry cell batteries have drawbacks in that the cases are not sufficiently tight, particularly against internal gas overpressures characteristic of primary batteries.

Finally, it is well known to arrange in a storage battery cell a plurality of positive and negative electrode plates which are separated from each other by insulating sheets, and to connect the positive and negative plates in parallel for increased capacity. This parallel-circuit arrangement, however, is always provided within a single cell, and cannot be used to obtain a series connection of the battery plates.

SUMMARY

The above disadvantages and drawbacks of prior storage and primary batteries are obviated by the present invention, and one object of the invention is to provide an improved multi-cell electric battery wherein there is had optimum space and weight utilization, and in addition, a substantial reduction of parts and assembly costs.

This is accomplished, according to the invention, by stacking the individual cells in a single common metal box or casing, using spacer and support rings which correspond to the height of each cell, and which are pressed essentially against each other, the individual cells being sealed tightly by means of interposed separating, contact plates that engage the support rings and are insulated from each other and from the battery terminals. The single, common metal box or container is sealed so as to be gas and liquid tight, by means of a common cover and common gasket.

Only a single metal casing or box, only a single common box cover, and only a single common box seal are required by the invention. This results in a considerable reduction in the number of boxes and other parts, and thus a substantial cost reduction, as well as savings in weight and volume, considering the output or capacity of the battery. Despite the single, common metal box which contains all the cells, the invention ensures that each cell forms a self-contained unit which is electrically insulated from its environment, except for the desired series connections. In particular, the invention ensures that no ion exchange can take place between the electrolytes of adjacent or other cells.

In a preferred embodiment of the invention, the spacer and support rings consist of electrically insulating, sealing material, preferably constituted of plastic substance. This enables the spacer and support rings to accomplish at the same time a full, reliable seal at the circumference of each cell, so that the separating, contact plates need only form the front or top, tight seal of the cells and can themselves cooperate insulatingly and sealingly with the spacer and support rings.

The separating, contact plates can consist of metal foil, and can be electrically insulated at locations outside of their contact regions, particularly from the metal box. Such separating contact plates can be provided with embossing, to improve the contact with electrodes arranged at each side of the plates. On the other hand, the electrical insulation of the separating contact plates outside of their contact regions ensures that none of the cells which are combined in the battery will be short-circuited. Various possibilities exist for the electrical insulation of the separating contact plates beyond the contact region. For example, the plates can be separated a distance from the metal box by the spacer and support rings which receive the plates between them. In addition, the spacer and support rings can be provided each at one end face with an axially projecting outer edge to effect an electrically insulating centering means for the plates.

Another possibility for the electrical insulation of the separating contact disks consists in providing the metal box on its inner circumferential surface with an electrically insulating coating.

Finally, it is possible, within the framework of the invention, to make the separating contact plates of electrically insulating material, preferably plastic, and to provide in their central regions a metal contact bushing. Or, the separating contact plates can be made of electrically insulating material so as to be integral with one of the spacer and support rings. Still another possibility consists in making the spacer and support rings for two adjacent cells together of electrically insulating material and integral with the separating contact plate arranged between the two cells.

In order to simplify the manufacture, the spacer and support ring of the topmost cell can be made integral with the sealing gasket of the container.

Within the framework of the invention, the storage battery can be built in any manner suitable for the intended use. If it is desired to build a storage battery with a relatively high capacity, the individual cells can consist of electrode packs containing two, three or more parallel-connected electrode plates with intermediate, separator layers. The cross-sectional form of the battery, and thus of the individual stacked cells, can be selected according to the desired use. It is important for the operating safety of the battery that the self-contained cells be constantly physically pressed against each other. The force for pressing the cells against each other can be maintained by a compression spring arranged between the common box cover and the top electrode. But it is also possible, within the framework of the invention and perhaps even preferably, to maintain the force for pressing the cells against each other by an elastic design of the common box cover which bears on the top electrode.

Several embodiments of the invention will illustrate it more fully, on the basis of the accompanying drawings, wherein.

Figure 1:
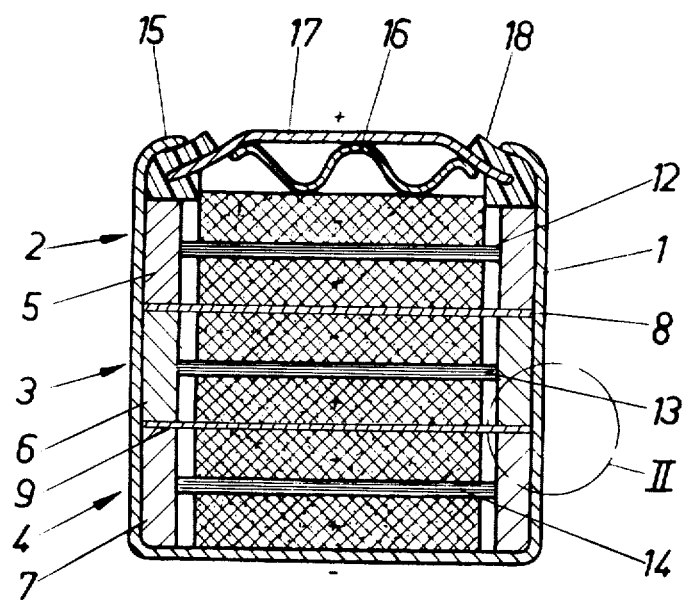
FIG. 1 is an axial sectional view, enlarged, of a multi-cell storage battery made according to the invention, comprising three series-connected cells.

Referring first to FIG. 1, there is illustrated a battery of storage cells constituted in accordance with the invention, comprising three series-connected units shown in axial section. The battery comprises a one-piece outer metal casing or container 1, in which as provided by the invention there are disposed three cells 2, 3 and 4 including stacked, insulating and sealing support or spacer rings 5, 6 and 7, which line the side walls of the container. The rings 5, 6 and 7 can advantageously be constituted of plastic material, and can be inserted through the top filler opening of the container. Interposed between the stacked rings 5, 6 and 7 there are provided thin contact and isolator plates 8 and 9, which can be of metal foil whereby they constitute a means to establish electrical contact between an element of one cell and an element of an adjoining cell. Due to the provision of the thin contact plates 8, 9 of metal foil, as arranged between the individual support rings 5, 6 and 7, the battery volume is divided into three substantially equal spaces or sealed compartments, one for each of the storage cells 2, 3 and 4, which comprise electric cell elements respectively.

Figure 2:
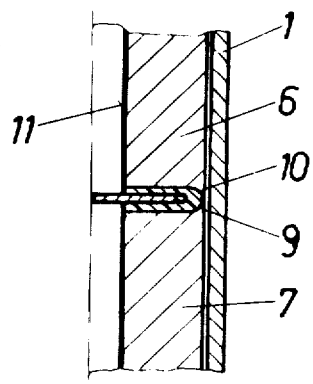
FIG. 2 is a fragmentary section, further enlarged, of the partial region II of FIG. 1.

As can be seen from the partial region II of FIG. 1, shown on an enlarged scale in FIG. 2, the individual support rings 5, 6 and 7 are isolated from each other by circumferential sealing insulation 10 embracing the outer edge zones of the isolating contact plates 8 and 9. The sealing insulation 10 also prevents contact between the contact plates 8 and 9 and the case or box 1. The insides of the support rings 5, 6 and 7 are provided with an insulating varnish coat 11. The inner circumferential surface of the case 1 can likewise be provided with an insulating varnish coat. The varnish coat 11 serves, on the one hand, as a protection against corrosion, and on the other hand, as an insulation for the case 1 against contact with the isolating contact plates.

Each of the cells 2, 3 and 4 has a positive electrode labelled (+), and a negative electrode labelled (−), said electrodes being separated from each other by paper separators 12, 13 and 14 (see FIG. 1). The positive and negative electrodes are so placed on one another that a negative electrode is electrically connected with the following top positive electrode, but electrolytically separated from it by one of the contact plates 8 or 9.

The case 1 is flanged at the top edge 15. Due to an inserted compression spring 16, the cover 17, whose circumferential edge is enclosed by a sealing means or gasket 18, is firmly pressed against the flange 15, thereby closing and sealing the filler opening of the case or container. The spring 16 thus constitutes a means for applying a compression force between the underside of the cover 17 and the container bottom, to maintain the stack of rings under continual compression and the side walls of the container under continual axial tension. In this way the storage battery is sealed so as to be gas and liquid tight. Because of the spring pressure, the contact plates 8 and 9 and the sealing insulation 10 are also pressed and held engaged with the support rings 5, 6 and 7. Since the spring pressure acts furthermore through the thin contact plates 8 and 9 down to the bottom electrode or bottom of the case 1, the individual cells 2, 3 and 4 are uniformly pressed against each other. It is seen that the cover 17 is disposed at the top end of the stack of spacer rings whereas the casing or container bottom is disposed at the lower end of the stack of rings. The container bottom can act as part of one electrode of the lowermost cell 4, or else merely as a terminal.

Figure 3:
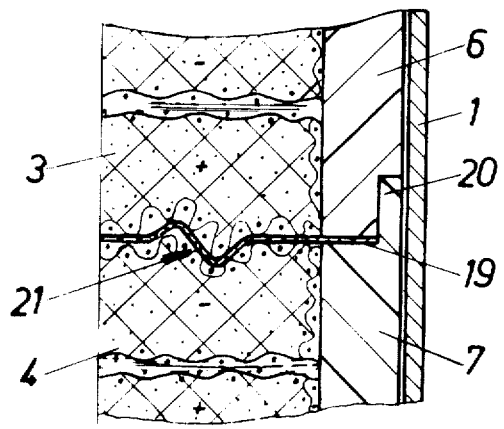
FIG. 3 is a view like that of FIG. 2, but encompassing more of the battery and showing a modified form of the invention.

FIG. 3 shows likewise a variant of the enlarged partial region II of FIG. 1. In this figure, the support rings 6 and 7 are shown as not setting flat on each other with their full surfaces. Instead, in order to keep the contact plate 19 centered at a distance from the metal case 1, the support rings 6 and 7 are provided with annular recesses formed by axially projecting portions such as 20 at their end faces. Though the contact plate 19 is likewise arranged between the bearing surfaces of the support rings 6 and 7, it is at its peripheral portions radially enclosed and thereby spaced from the container sides and electrically insulated by the axially projecting outer edge 20. The contact plate 19 is provided, particularly in the contact region, with embossing or corrugations 21. The corrugations 21 improve the contact with the electrode plates arranged on each side of the contact plate 19.

Several such embossings 21 can be provided in each contact plate. The supporting rings 6 and 7 are preferably made of plastic in the embodiment shown in FIG. 3.

Figure 4:
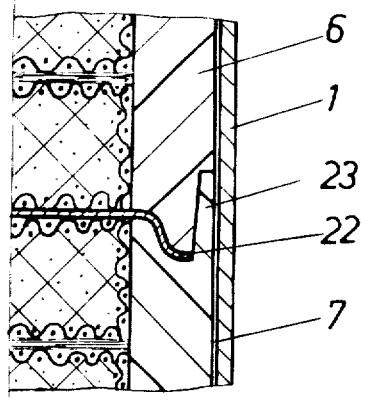
FIG. 4 is a view like that of FIG. 3, but showing a third variant of the invention.

In the variant of the partial region II, shown enlarged in FIG. 4, the circumferential edge of the contact plate 22 is pulled down to form an S-shaped cross section. The axially projecting outer edge 23 of the lower supporting ring 7 ensures an electrical insulation and radial enclosure of the contact plate 22 with regard to the case 1. The support rings 6 and 7 are in this embodiment likewise preferably made of plastic.

Figure 5:
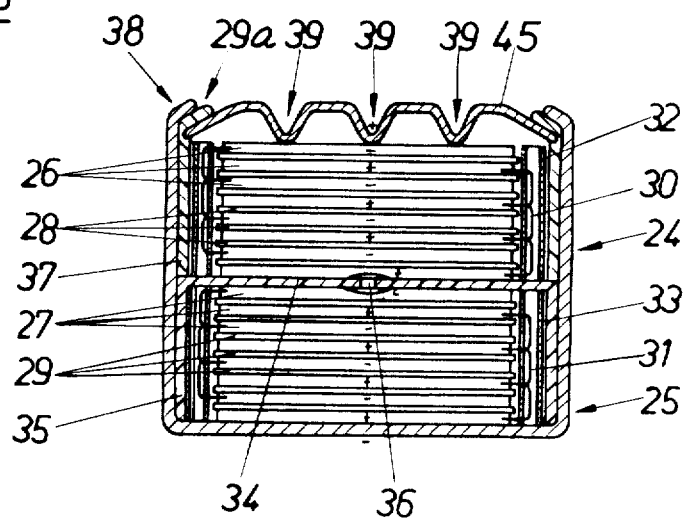
FIG. 5 is an axial sectional view of a storage battery according to the invention, illustrating yet another embodiment thereof.

In the storage battery shown in FIG. 5, two banks of storage cells 24, 25 are provided, each with eight parallel-connected individual electrodes 26, 27. This type of arrangement is particularly suitable for those uses where a relatively high capacity with a low internal resistance is desired. The parallel-connected single electrodes 26, 27 are separated from each other by intermediate separator layers 28, 29. The connections between the individual electrodes 26, 27 in the respective cells 24, 25 are established by the leads 30, 31, which as well as the individual cells 26, 27 are insulated from the case 1 by the members 32, 33. The separating or contact plate 34 is made of insulating material, preferably plastic, and is shown as integral with the spacer and support ring 35. The contacting is effected by a central metal contact button or bushing 36.

As can be readily seen from the sectional drawing of FIG. 5, the spacer support ring 37 of the top cell 24 is made integral with a gasket 29a and rests on the isolating contact plate 34. The gasket 29a is provided with a circumferential groove into which the cover 45 is inserted. The gas and liquid tight sealing of the case is effected by flanging the upper case edge 38; the necessary pressure for pressing the cells 24, 25 against each other and for pressing the cover 45 against the gasket 29a or the flange is effected by the corrugations 39 provided in the cover 45.

Figure 6:
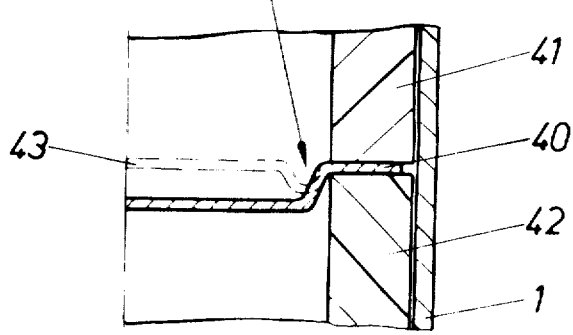
FIG. 6 is a view like those of FIGS. 3 and 4, but showing a fourth variant.

FIG. 6 shows another embodiment of the invention, and can be referred to the partial region II of FIG. 1. The separating plate 40 is dished. Due to this profiling, the plate 40 is so centered that the circumferential edge located between the spacer and support rings 41, 42 does not come in contact with the case 1 and is thus insulated from the case. Due to the dish-shaped cross section of the contact plate 40, an adaptation of the overall height can be achieved despite the different heights of the cells, without changing the height of the spacer and support rings 41 and 42.

Another centering possibility is indicated if the plate 40 is later formed as indicated by the broken lines in FIG. 6, resulting in a corrugation 44. The corrugation can be continuous or discontinuous and distributed over the circumference.

The above described construction principle can also be used for gas-tight storage batteries of other systems, such as silver-zinc, silver-cadmium or lead oxide-lead batteries. Furthermore, various types of electrodes can be used, such as pressed electrodes, sintered electrodes and pocket electrodes, as well as metal fiber or yet other types of electrodes.

In embodiments of the invention providing batteries with larger capacities, an overpressure safety valve (not shown) can be provided. One overpressure safety valve is sufficient for each battery, because the pressure propagates over the separating and contact plates.

The cross-sectional form of the storage battery and thus of the individual stacked cells can be circular, oval, rectangular or have any other geometric cross section or form required by the design, and other variations are possible without departing from the spirit of the invention.

The present application is based on a corresponding application which has been filed in the Federal Republic of Germany, under Ser. No. P 23 53 958.4, filing date — Oct. 27, 1973, and entitled "GASDICHTE AKKUMULATOR-BATTERIE"; it is respectfully requested that this case be accorded the benefit of the German filing date under the provisions of 35 USC 119.

I claim:

1. An electric battery comprising, in combination:
 a. a metal container having a filler opening,
 b. a plurality of stacked spacer rings disposed in the container, arranged to line the side walls thereof,
 c. isolator plates interposed between adjacent spacer rings and sealing therewith to form a plurality of sealed compartments in the container,
 d. electric cell elements respectively in said compartments,
 e. said isolator plates having means to establish electrical contact between an element of one cell and an element of an adjoining cell,
 f. a cover fitted to the filler opening of the container, and
 f. means sealing the cover to the container.

2. A battery as in claim 1, wherein:
 a. the cover is disposed at one end of the stack of spacer rings,
 b. the bottom of the casing being disposed at the other end of the stack of rings, and
 c. means applying compression force between the underside of the cover and container bottom, to maintain the stack of spacer rings under continual compression and the side walls of the container under continual axial tension.

3. A battery as in claim 2, wherein:
 a. said means for applying a compression force comprises a compression spring engaged with the container cover.

4. A battery as in claim 2, wherein:
 a. the cover includes means for applying the compression force.

5. A battery as in claim 2, wherein:
 a. the spacer rings are constituted of insulating plastic substance.

6. A battery as in claim 5, wherein:
 a. an insulator plate is formed integral with a spacer ring.

7. A battery as in claim 5, wherein:
 a. an end spacer ring of the stack includes said means for sealing the cover to the container.

8. A battery as in claim 5, wherein:
 a. the spacer rings have recesses to receive peripheral portions of the isolator plates and maintain the same spaced from the container sides.

9. A battery as in claim 8, wherein:
 a. the spacer rings having axially protruding end edge portions forming the recesses thereof.

10. A battery as in claim 1, wherein:
 a. the isolator plates are constituted of metal foil,
 b. said plates being insulated from the container.

11. A battery as in claim 10, wherein:
 a. the isolator plates are embossed to increase their effective areas.

12. A battery as in claim 1, wherein:
 a. the container has an electrically insulating coating on the interior of its side walls.

13. A battery as in claim 1, wherein:
 a. the isolator plates comprise insulating plastic substance, and
 b. said means to establish electrical contact comprises metal contact members carried by said plates.

14. A battery as in claim 1, wherein:
 a. the cell elements in each compartment comprise electrode packs having intermediate separator layers,
 b. said electrode packs comprising parallel-connected cells.

* * * * *